United States Patent [19]
Majeed et al.

[11] Patent Number: 5,510,988
[45] Date of Patent: Apr. 23, 1996

[54] VEHICLE CHASSIS CONTROL SYSTEM

[75] Inventors: Kamal N. Majeed, Centerville; Albert V. Fratini, Jr.; Scott A. Stacey, both of Kettering; Eric L. Jensen, Dayton, all of Ohio; Jay R. Varner, South Bend, Ind.; James W. Hauser, West Chester, Ohio

[73] Assignees: General Motors Corporation, Detroit, Mich.; Delco Electronics Corporation, Kokomo, Ind.

[21] Appl. No.: 358,925

[22] Filed: Dec. 19, 1994

[51] Int. Cl.$^6$ .......................... B60G 11/26; B60G 17/08
[52] U.S. Cl. ................... 364/424.05; 280/707; 280/840; 180/41
[58] Field of Search .................. 364/424.05; 280/707, 280/840, 6.1, 6.11, 688; 180/41

[56] References Cited

U.S. PATENT DOCUMENTS

| | | | |
|---|---|---|---|
| 4,897,776 | 1/1990 | Urababa et al. | 364/424.05 |
| 5,024,460 | 6/1991 | Hanson et al. | 280/707 |
| 5,034,890 | 7/1991 | Sugasawa et al. | 364/424.05 |
| 5,062,657 | 11/1991 | Majeed | 280/707 |
| 5,062,658 | 11/1991 | Majeed | 280/707 |
| 5,071,157 | 12/1991 | Majeed | 280/707 |
| 5,096,219 | 3/1992 | Hanson et al. | 280/707 |
| 5,119,297 | 6/1992 | Buma et al. | 364/424.05 |
| 5,203,584 | 4/1993 | Butsuen et al. | 280/707 |
| 5,235,529 | 8/1993 | Hanson | 364/572 |
| 5,255,191 | 10/1993 | Fulks | 364/424.05 |

FOREIGN PATENT DOCUMENTS 0114757  8/1984  European Pat. Off. .

Primary Examiner—Kevin J. Teska
Assistant Examiner—Tan Q. Nguyen
Attorney, Agent, or Firm—Robert M. Sigler

[57] ABSTRACT

A vehicle has a real time suspension control which requires, as inputs, a set of absolute body modal velocity signals. Accurate estimates of these signals are derived from relative position sensors at the body suspension points by converting the relative vertical position signals from these sensors to relative body modal (e.g. heave, pitch and roll) velocity signals and passing each of these signals through a second order low pass filter including an additional phase inversion for compensation of the 180 degree filter phase lag. Thus, the necessity of absolute body accelerometers is eliminated, for a significant cost reduction. In a vehicle having significant front to rear flexing or flexing within the front or rear suspension that can affect the accuracy of the estimated absolute body roll velocity, the normal roll velocity transformation equation is modified to include only the front or the rear pair of relative velocity signals.

23 Claims, 7 Drawing Sheets

VEHICLE CHASSIS CONTROL SYSTEM

BACKGROUND OF THE INVENTION

U.S. Pat. Nos. 5,071,157 and 5,096,219 describe real time controlled vehicle suspension systems that use eight primary sensors to sense wheel and body states for suspension control. The eight primary sensors include four position sensors, which measure relative vertical position between the vehicle body at each of the four vehicle wheels, and four accelerometers, which measure the absolute vertical body acceleration at each corner of the vehicle adjacent a vehicle wheel. The signals from these sensors are provided to a control which varies, in real time, the damping of a variable damper or actuator between each vehicle wheel and its corresponding body corner.

In each of these prior art systems, the desired force to be exerted by each damper or actuator is computed as a combination of the absolute vertical wheel velocity of the associated wheel and three independent absolute body modal velocities defining body motion with reference to an inertial frame of reference, such as absolute body heave, roll and pitch velocities. In the system of U.S. Pat. No. 5,071,157, for example, the body accelerometer outputs are integrated to obtain absolute body vertical velocity signals, which are geometrically transformed into absolute body heave, roll and pitch velocity signals. Each of the relative position sensor outputs is differentiated to obtain a relative body/wheel velocity signal for the respective wheel, which can be subtracted from the absolute body vertical velocity signal for the wheel to obtain an absolute vertical wheel velocity signal. The system of U.S. Pat. No. 5,096,219 differs from the preceding by first transforming the absolute body acceleration signals to absolute body heave, roll and pitch acceleration signals before integrating the latter to obtain the absolute body modal velocity signals but is otherwise similar in operation. In each case the required absolute body modal velocity signals are derived from body corner mounted accelerometers, which add significantly to the cost of the system.

SUMMARY OF THE INVENTION

Advantageously, this invention provides a method and apparatus for controlling a vehicle chassis system, such as a variable force suspension system, that reduces the number of sensors required for reduced cost.

Advantageously, this invention provides a method and apparatus for controlling a vehicle suspension system in real time that reduces the number of primary input sensors for sensing the vehicle and suspension states to four sensors.

Advantageously, this invention provides a method and apparatus for estimating absolute body modal states of a motor vehicle while eliminating absolute body (corner) accelerometers as were previously required.

Advantageously, this invention provides a method and apparatus for determining estimated absolute body modal velocities from the information provided by vehicle body/wheel relative position or velocity sensors.

These and other advantages are achieved by this invention in a motor vehicle suspension control system by (a) obtaining from a set of sensors, mounted to sense vertical motion between a set of vehicle wheels and a vehicle body suspended therefrom, a set of relative velocity signals between the set of vehicle wheels and a set of points on the suspended vehicle body; (b) determining from the set of relative velocity signals a set of estimated absolute body modal velocity signals for the suspended vehicle body; and (c) controlling a controllable chassis system responsive to the determined set of estimated absolute body modal velocity signals.

The method and apparatus may further determine the set of estimated absolute body modal velocity signals as the estimated absolute body heave, roll and pitch velocity signals. Each of these estimated absolute body modal velocity signals may be determined by geometrically transforming the set of relative velocity signals into a relative modal velocity signal and filtering the relative modal velocity signal through a two pole, low pass filter which includes an additional phase inversion for phase compensation. Each of the low pass filters is effective to pass signals having frequency characteristics of resonant motion of the vehicle body in the heave, roll and pitch modes, respectively, but to significantly reduce signals having higher frequency characteristics of a vehicle wheel in vertical motion. The additional phase inversion of each of the low pass filters is provided to match the phase of a velocity signal derived from a vehicle body mounted absolute accelerometer.

The method and apparatus may generate relative velocity signals between vehicle wheels and adjacent points on the vehicle body by electrically differentiating the outputs of relative position sensors mounted to sense relative body/wheel motion or directly from relative velocity sensors. The estimated absolute body modal velocity signals may be determined from the relative velocity signals in a digital microcomputer programmed to perform the low pass filtering and phase inversion. Implementation of the low pass filters in a programmed digital microcomputer allows the required phase compensation to be accomplished through simple sign inversion of one or more numerical values, either in selected, stored gain constants of the discrete filter equations or in the output values of those equations.

These and other details and advantages of the invention will be apparent from the accompanying drawings and following description of a preferred embodiment.

DETAILED DESCRIPTION OF THE INVENTION

Figure 1:
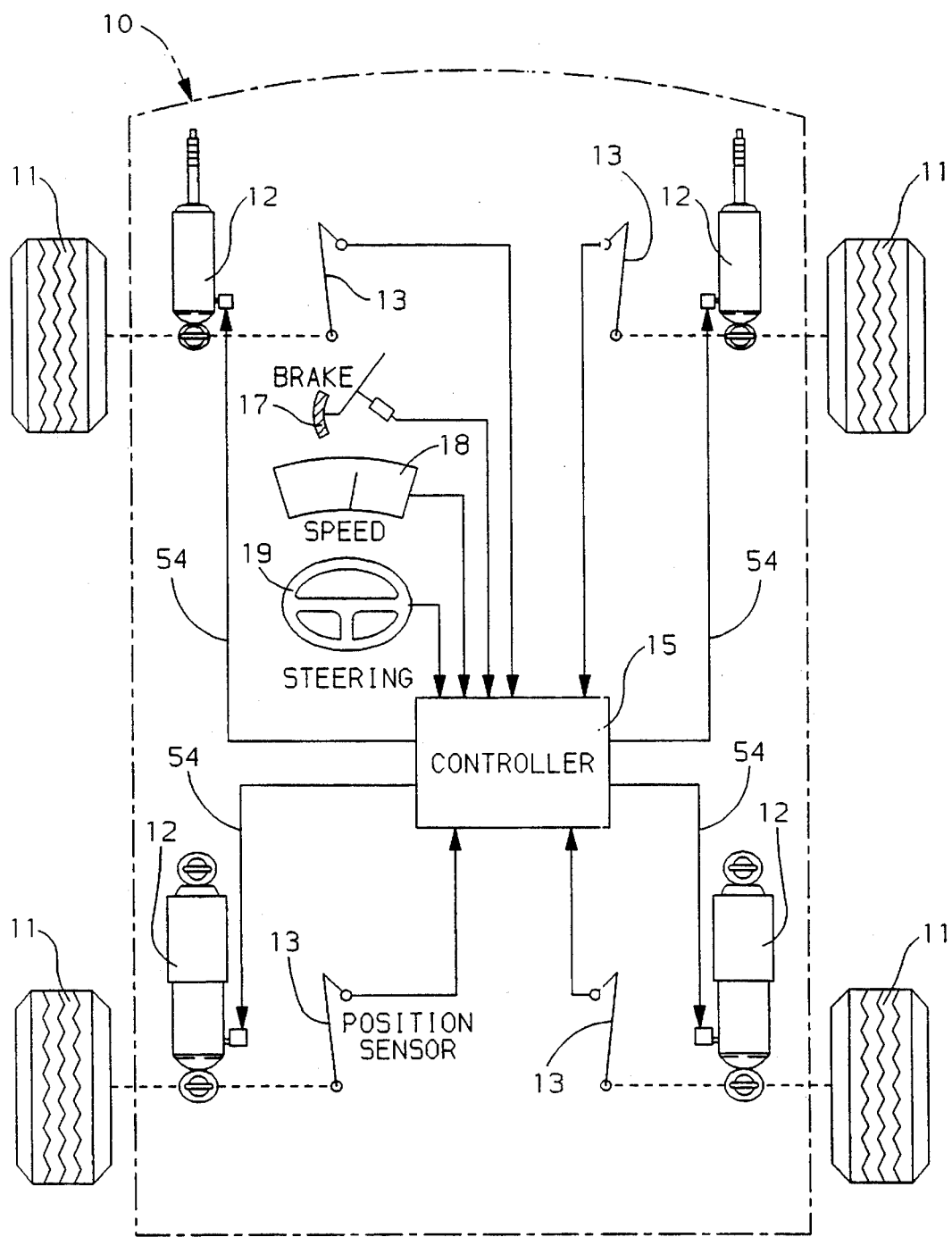
FIG. 1 illustrates schematically a vehicle and suspension system according to this invention.

Referring now to FIG. 1, a vehicle body 10 comprising a sprung mass is essentially rectangular in shape and rigid in construction and is supported on wheels 11 at suspension points comprising each of its four corners by suspension apparatus comprising a suspension actuator 12 connected to exert a controllable vertical force between wheel 11 and body 10 at that suspension point. Actuator 12 comprises one or more force generating elements, at least one of which is controllable to vary a force in response to an external electrical signal. Although many such suspension arrangements are known and appropriate to this invention, actuator 12 of this embodiment comprises an electrically controllable, variable force damper in parallel with a weight bearing coil spring in a parallel shock absorber/spring or McPherson strut arrangement. A description of a variable force damper suitable for use as actuator 12 is the bi-state damper described in the previously mentioned U.S. Pat. No. 5,071,157, although continuously variable dampers and energy providing actuators are also contemplated.

Each corner of the vehicle includes a linear relative position sensor 13 that provides an output signal indicative of the relative vertical distance between the vehicle wheel and the suspended vehicle body at that corner of the vehicle. Relative position sensors 13 may be of the type having a link coupled to the vehicle wheel and pivotally connected to a pivot arm on a rotary resistive device that provides an impedance output that varies with the relative position between wheel 11 and the corner of body 10. Each relative position sensor 13 may include an internal circuit board with a buffer circuit for buffering the output signal of the rotary resistive device. Any alternative type of position sensor, including transformer type sensors, may also be used.

The outputs of relative position sensors 13 are provided to a controller 15 which processes the signals to determine the states of vehicle body 10 and wheels 11 and generates an output actuator control signal for each variable actuator 12. These signals are applied from controller 15 through suitable output apparatus to control actuators 12 in real time. Input signals for the determination of the output actuator control signals may also be provided to microcomputer by vehicle brake apparatus 17 to provide anticipation of vehicle pitch or by a vehicle speed sensor 18 and a steering wheel angular position sensor 19 to provide anticipation of vehicle roll. Obtaining such signals is easily achieved through the use of known types of sensors available to those skilled in the art.

Figure 2:
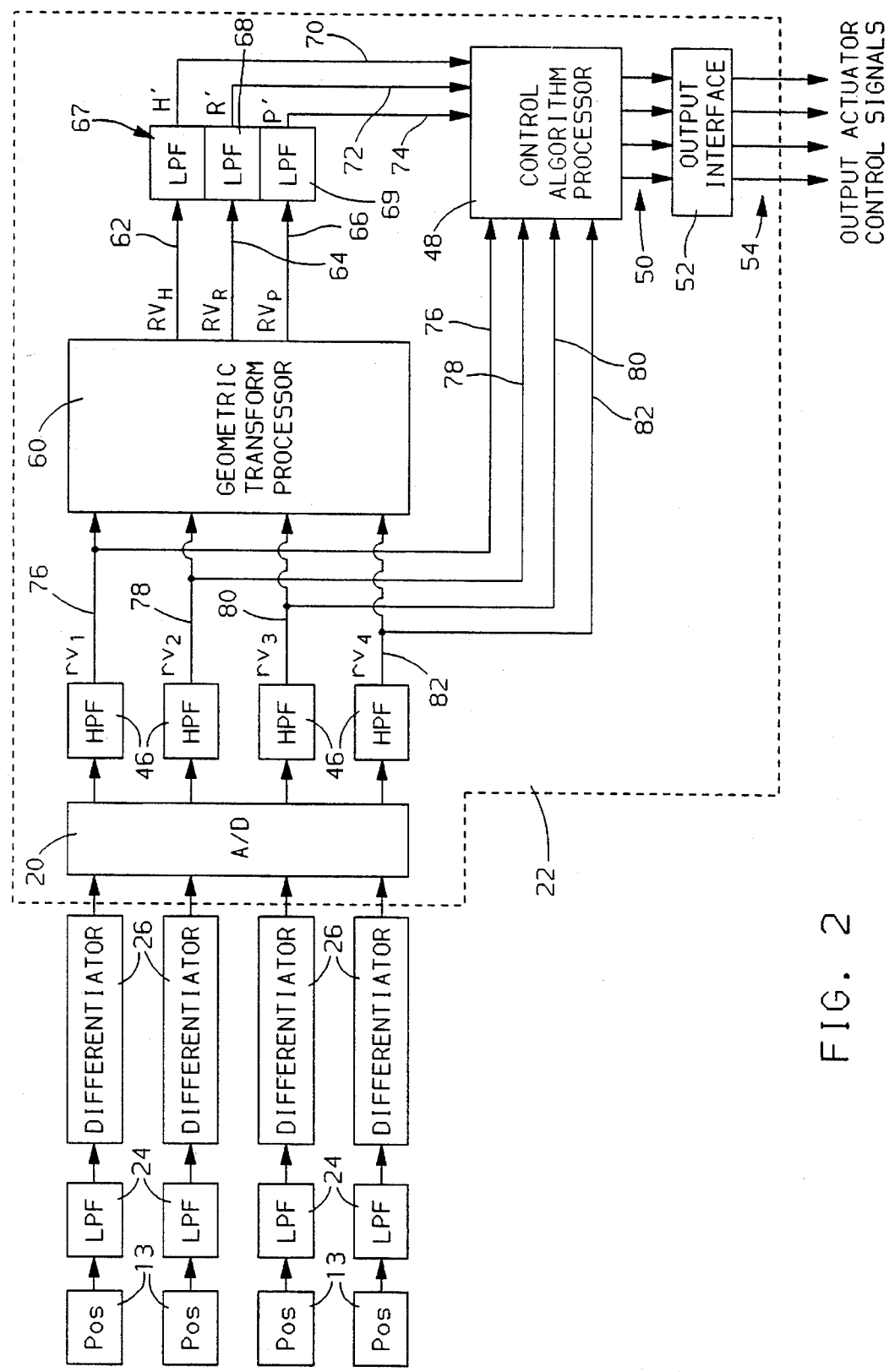
FIG. 2 illustrates schematically a controller for the suspension system of FIG. 1 according to this invention.

Controller 15 is shown in more detail in FIG. 2. Signals from relative position sensors 13 are low-pass filtered through four analog low-pass filters 24 and differentiated through four analog differentiators 26 to provide four relative velocity signals. An exemplary combination of such a low pass filter and differentiator is shown in U.S. Pat. Nos. 5,255,191, issued Oct. 19, 1993. The resulting relative velocity signals represent the relative velocity between the front left wheel and the front left corner of the body, $rv_1$, the rear left wheel and the rear left corner of the body, $rv_2$, the front right wheel and the front right corner of the body, $rv_3$, and the rear right wheel and the rear right corner of the body, $rv_4$. Each of these relative velocity signals is input to a digital microcomputer 22 which includes an input A/D converter 20 with multiplexed inputs; and each is digitally high-pass filtered within microcomputer 22 by a high pass filter 46 to remove any DC offset introduced by the digitation of A/D converter 20. The resulting filtered relative velocity signals are provided on lines 76, 78, 80 and 82 as a set of inputs to a control algorithm processor 48 to help determine the output actuator control signals for the vehicle suspension system.

Another set of inputs to control algorithm processor 48 were provided in the prior art from vehicle body mounted absolute acceleration sensors, through integrators to obtain the body modal velocities required to define the motion of the full vehicle body for the control of each damper. In this invention, as described in the embodiment of FIG. 2, estimated absolute body modal velocities are derived from the filtered relative velocity signals on lines 76, 78, 80 and 82. These lines provide the filtered relative velocity signals to a geometric transform processor 60 to convert the filtered relative velocity signals to relative body modal velocity signals: a relative heave velocity signal on line 62, a relative roll velocity signal on line 64 and a relative pitch velocity signal on line 66.

In digital microcomputer 22, signals are represented by numbers representing discrete samplings thereof at a 1 Khz sampling rate (1 ms sampling period), and signal processing is accomplished by mathematical algorithms. Geometric transform processor 60 uses the following transform equations to obtain the relative heave velocity signal ($RV_H$), relative roll velocity signal ($RV_R$) and relative pitch velocity signal ($RV_P$) according to this invention:

$$RV_H = (rv_1 + rv_2 + rv_3 + rv_4)/4$$

$$RV_R = (-rv_1 - rv_2 + rv_3 + rv_4)/(2*tw)$$

$$RV_P = (-rv_1 + rv_2 - rv_3 + rv_4)/(2*wb)$$

where tw is the average track width or wheel span of the vehicle and wb is the wheel base of the vehicle. These equations, which use all four relative velocity signals, are well known in the art as transformation equations between body corner vertical parameter (position, velocity, acceleration) signals and the equivalent body heave, roll and pitch parameter (position, velocity, acceleration) signals.

Once microcomputer 22 performs the above transformations in geometric transform processor 60, the relative heave, roll and pitch velocity signals are provided to specially designed digital low-pass filters 67, 68 and 69. Low-pass filters 67–69 provide a significant amplitude roll-off above the 1 Hz signals typical of resonant body modal vibrations so as to suppress the 10 Hz signals typical of resonant vertical wheel vibrations and thus yield a signal with information about the amplitude of vehicle body motion in the heave, roll and pitch modes. However, for such signals to be usefully applied in a real time control system, their phase is critical. Low pass filters tend to produce a phase lag in the signal; and this phase lag increases across the frequency spectrum through a range that increases with the number of filter poles. In order to produce effective control, in real time, of rapidly moving suspension components, the signal must be applied in correct phase relationship thereto. In order to emulate the integrated output of an absolute accelerometer, a phase lead of approximately 90 degrees is required, while a low pass filter generally produces a phase lag. However, it has been found that a two pole, low pass filter applied to the relative body modal velocity signal will produce a signal with a 90 degree phase lag which can be inverted to provide the required 90 degree phase lead.

A suitable second order low-pass filter for use in the estimation according to this invention is described as:

$$H_q(s)=K_q[\omega_o^2/(s^2+(\omega_o Q)s+\omega_o^2)],$$

where $K_q$ is the filter gain, $\omega_o$ describes the filter pole locations in radians and Q is the filter quality factor. Low-pass filters 67–69 may be adjusted independently for each mode to help tune the resultant estimated modal velocity signals to match, in magnitude and, with an additional phase inversion, in phase, signals achieved by the prior art utilizing accelerometers or to match the performance of another device from which the same measurements may be obtained, such as external velocity sensors or gyroscopes. The values of the filter gain, pole locations and quality factor tend to change from vehicle type to vehicle type due to differences in the natural body and wheel frequencies of different vehicle models. The heave, roll and pitch velocities obtained are estimations, since they are derived from relative measurements and not from absolute measurements.

In one example implementation the continuous time parameters for the low pass filters 67–69 are shown in the following table.

| MODE | $K_q$ | $\omega_o$ | Q |
|---|---|---|---|
| HEAVE | −13.889 | 3 | 0.35 |
| ROLL | −18 | 5 | 0.50 |
| PITCH | −7.8125 | 4 | 0.40 |

Figure 3A:
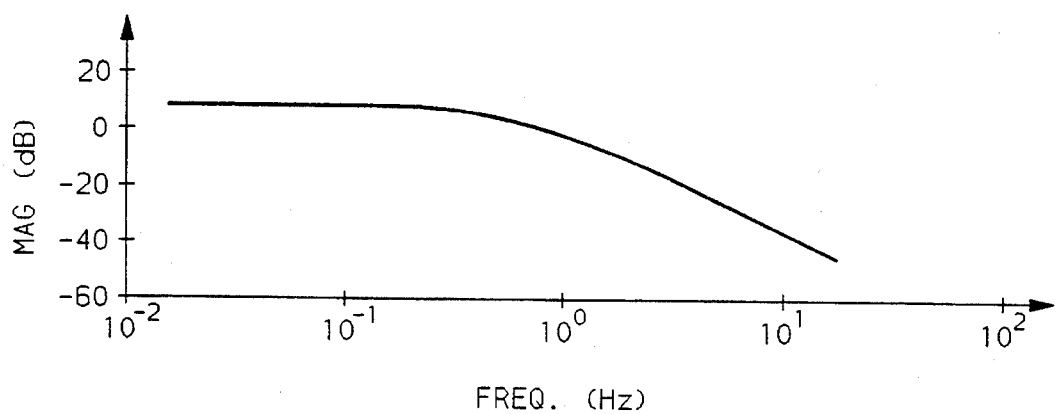
FIGS. 3A and 3B illustrate an exemplary frequency and phase response of a low pass filter with additional phase inversion used in the control of FIG. 2.
Figure 3B:
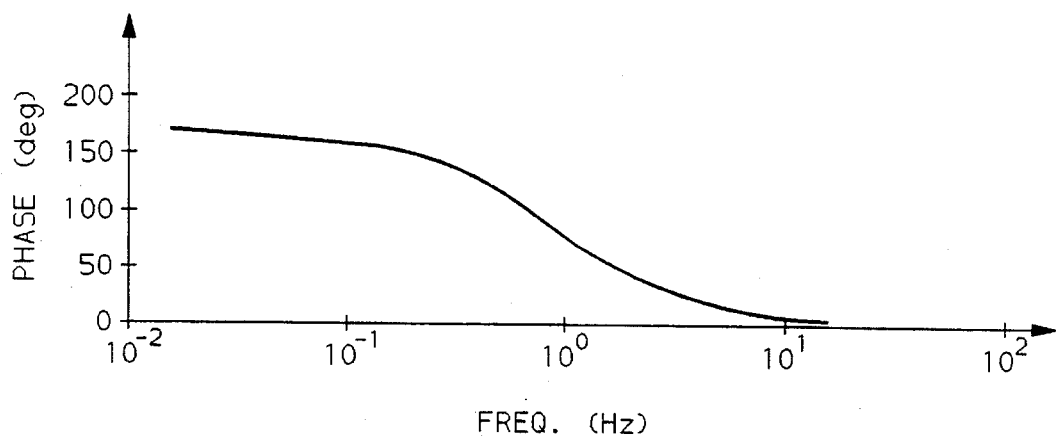

Typical magnitude and phase frequency responses for the two pole, low-pass filters 67–69 are shown in FIGS. 3A and 3B, respectively. FIG. 3A shows the roll-off in amplitude above i Hz which provides an output signal having mainly vehicle body movement information. FIG. 3B shows the phase response of a two pole, low pass filter having an additional phase inversion. Without the additional phase inversion, the phase curve would be shifted downward by 180 degrees—starting at zero degrees at the left side of the graph and decreasing with increasing frequency—to provide a 90 degrees phase lag at 1 (10°) Hz. With the additional phase inversion, however, the curve is shifted upward to provide a 90 degree phase lead at 1 Hz. Thus, the filter output has the desired phase relationship at the frequency of body resonance. In the table produced above, the additional phase inversion is achieved through the minus sign of the constant $K_q$.

Referring again to FIG. 2, the estimated absolute body heave, pitch and roll velocities from low pass filters 68, 69 and 70 are provided to control algorithm 48 on lines 70, 72 and 74, respectively; and the relative velocities $rv_1$, $rv_2$, $rv_3$ and $rv_4$ are provided to control algorithm 48 from lines 76, 78, 80 and 82, respectively. Control algorithm 48 may utilize the information of the relative velocities and the estimated absolute body heave, pitch and roll velocities in the same manner as that described in U.S. Pat. No. 5,071,157 to control a vehicle suspension system. However, while U.S. Pat. No. 5,071,157 describes one example for controlling a vehicle suspension responsive to the parameters of vehicle heave, pitch and roll velocity, it will be understood that any control algorithm making use of the estimated body heave, pitch and roll velocities or their equivalents according to this invention to control a vehicle suspension system or to otherwise control a vehicle chassis system such as a traction control system, braking system, etc., in real time, is contemplated by this invention. Control algorithm 48 provides output actuator control signals on lines 50 to output interface circuitry 52, from which they are routed to actuators 12 on lines 54.

Figure 4:
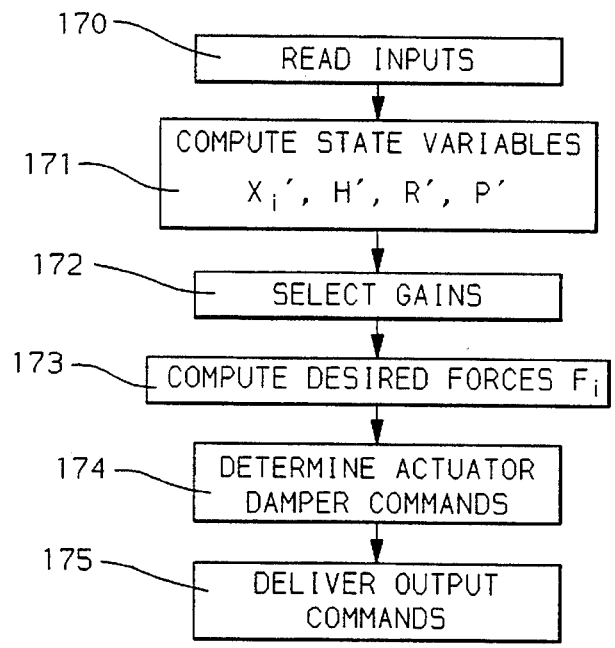
FIG. 4 is a flow diagram generally illustrating the operation of the control of FIG. 2.

FIG. 4 shows a flow routine for general control of a suspension system according to this invention. The flow routine starts at block 170 where it reads inputs from the various sensors as described herein; and it computes the state variables of the suspension system relative velocities and the estimated body heave, pitch and roll velocities at block 171. While the flow diagram shown in FIG. 4 is similar to that shown in FIG. 8 of U.S. Pat. No. 5,071,157, steps 170 and 171, according to this invention, are recognizable as modified from those described in U.S. Pat. No. 5,071,157.

At reference 170, since the body accelerometers are no longer required, there are no accelerometer signals to read into microcomputer 22. Thus, this step requires reading the differentiated position sensor signals, as well as any other signal such as vehicle brake, speed or steering, as previously mentioned. Step 171 computes the estimated absolute heave, pitch and roll velocity signals according to this invention, and an example routine for this computation is shown in FIG. 5.

Figure 5:
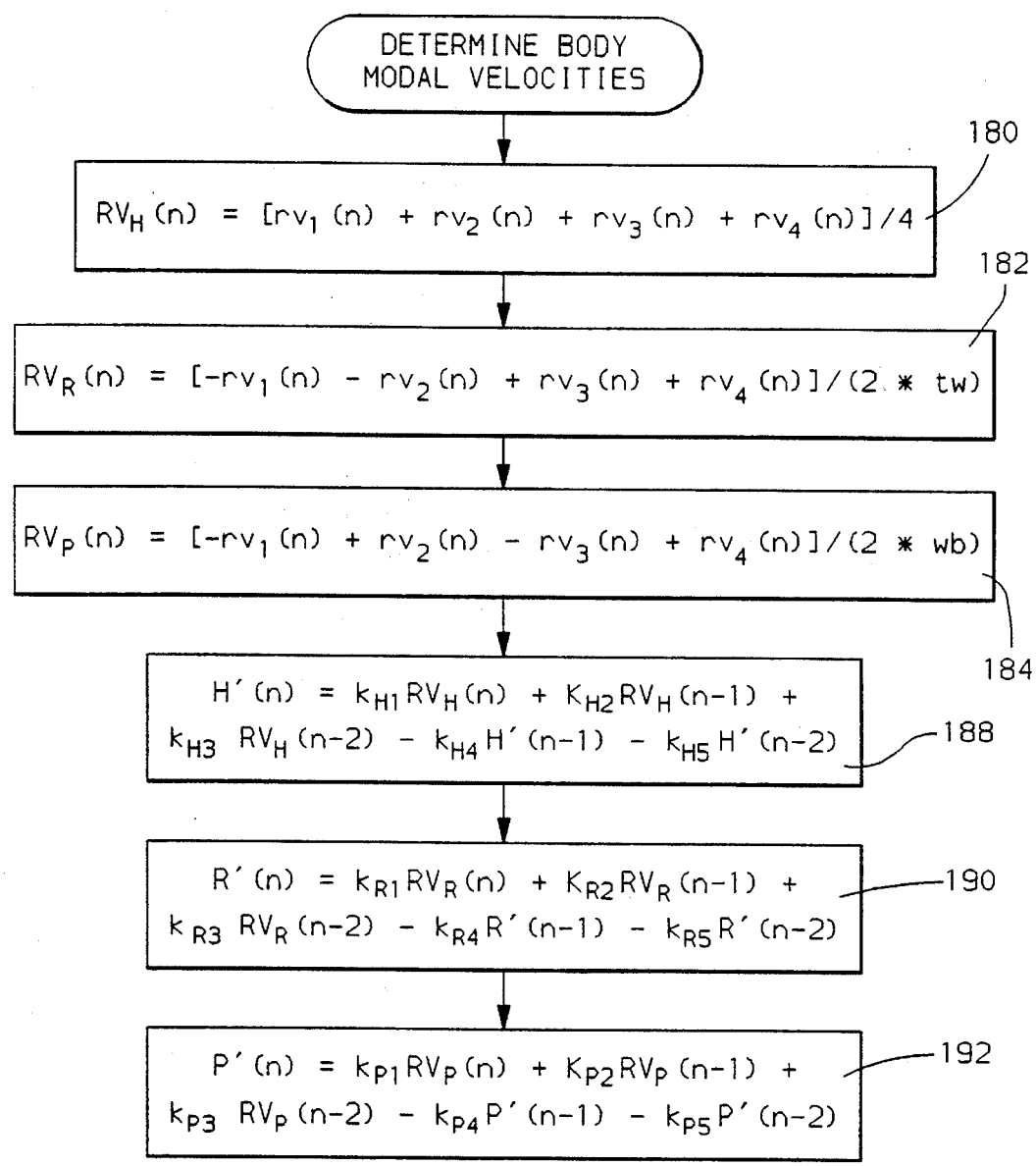
FIG. 5 is a flow diagram showing, in greater detail, a portion of the operation of the control of FIG. 2.

FIG. 5 shows the portion of step 171 which determines the estimated absolute modal velocities. The routine begins this determination with steps 180, 182 and 184 using geometric transformations to determine, according to this invention, the relative heave, roll and pitch velocity signals. In performing these programmed steps, microcomputer 22 comprises geometric transform processor 60. At block 180 the current discrete value of the relative heave velocity, $RV_H(n)$, is determined according to:

$$RV_H(n)=[rv_1(n)+rv_2(n)+rv_3(n)+rv_4(n)]/4,$$

where $rv_1(n)$, $rv_2(n)$, $rv_3(n)$ and $rv_4(n)$ are the current time relative velocity measurements from the front left, rear left, front right and rear right suspensions.

At block 182 relative roll velocity is determined according to:

$$RV_R(n)=[-rv_1(n)-rv_2(n)+rv_3(n)+rv_4(n)]/(2*tw)$$

where tw is the track width or wheel span of the vehicle. At block 184, relative pitch velocity is determined according to:

$$RV_P(n)=[-rv_1(n)+rv_2(n)-rv_3(n)+rv_4(n)]/(2*wb)$$

where wb is the vehicle wheel base.

In block 188, microcomputer 22 then performs the low-pass filtering of the relative heave velocity $RV_H(n)$ to determine the estimated absolute heave velocity H'(n) of the body according to the discrete equation:

$$H'(n)=k_{H1}RV_H(n)+k_{H2}RV_H(n-1)+k_{H3}RV_H(n-2)-k_{H4}H'(n-1)-k_{H5}H'(n-2),$$

where (n), (n−1), (n−2) refer to the present and previous two time values of the respective variable and the values $k_{H1}$, $k_{H2}$, $k_{H3}$, $k_{H4}$ and $k_{H5}$ are the filter constants determined in a manner known to those skilled in the art responsive to the filter gain, $K_q$, pole locations, $\omega_o$, and filter quality factor, Q, described above. As the filter gain, pole locations and filter quality factor are adjusted to adjust performance, the values of the gains $k_{Hi}$ will vary accordingly in a known manner. Example values for $k_{H1}$, $k_{H2}$, $k_{H3}$, $k_{H4}$ and $k_{H5}$ are −3.117e−5, −6.2233e−5, −3.1117e−5, −1.9915 and 0.99147, respectively, for a bi-linear discretization with alms sampling period, where e-n symbolizes multiplication by $10^{-n}$.

At block 190, microcomputer 22 performs the digital low pass filtering of the relative roll velocity, $RV_R(n)$, to determine the estimated body absolute roll velocity, R'(n), according the equation:

$$R'(n)=k_{R1}RV_R(n)+k_{R2}RV_R(n-1)+k_{R3}RV_R(n-2)-k_{R4}R'(n-1)-k_{R5}R'(n-2),$$

where $k_{R1}$, $k_{R2}$, $k_{R3}$, $k_{R4}$ and $k_{R5}$ are the filter gains determined in a known manner responsive to the filter gain, pole locations and filter quality factor for the roll velocity low-pass filter. Example values of $k_{R1}$, $k_{R2}$, $k_{R3}$, $k_{R4}$ and $k_{R5}$ are -1.1194e-4, -2.2388e-4, -1.1194e-4, -1.9900 and 0.99005, respectively, for a bi-linear discretization with a1ms sampling period.

At block 192, the estimated body absolute pitch velocity, P'(n), is determined by low-pass filtering the relative pitch velocity, $RV_P(n)$, according to the equation:

$$P'(n)=k_{P1}RV_P(n)+k_{P2}RV_P(n-1)+k_{P3}RV_P(n-2)-k_{P4}P'(n-1)-k_{P5}P'(n-2),$$

where $k_{P1}$, $k_{P2}$, $k_{P3}$, $k_{P4}$ and $k_{P5}$ are filter gain constants determined in a manner known to those skilled in the art responsive to the filter gain, pole locations and filter quality factor for the second order low-pass filter for the pitch velocity. Example values of $k_{P1}$, $k_{P2}$, $k_{P3}$, $k_{P4}$ and $k_{P5}$ are -3.1094e-5, -6.2819e-5, -3.1094e-5, -1.9900 and 0.99005, respectively, for a bi-linear discretization with a1ms sampling period.

The results of the two pole, low pass filter equations for the estimated body modal velocities is phase corrected in the following manner. In the discrete equations for H'(n), R'(n) and P'(n), the first three terms, which include the present and previous two values of the relative heave, roll or pitch velocity, represent the numerator of the basic filter equation for $H_q(s)$ and may be called the numerator terms. In order to invert the sign of the evaluated value, it is sufficient to reverse the sign of the filter gain constants for each of these terms. The signs of the last two filter gain constants in each equation, which are the denominator terms including the previous two values of the output estimated modal velocity, are not changed. The sample values given above for the filter gain constants in each of the discrete equations for H'(n), R'(n) and P'(n) incorporate such a sign reversal and are thus phase inverted to change the 90 degree phase lag produced by each filter equation with no such compensation to the desired 90 degree phase lead of the estimated body modal velocities. Of course, a similar result could be achieved by reversing the signs of only the denominator terms.

Using the second order low pass filter and the discrete values determined according to bi-linear discretization, the discrete numerator values above are very small in magnitude. These small numbers may be difficult to represent in a computer having a fixed point, sixteen bit processor, since the least significant bit is $2^{-15}$. Floating point processors do not present the same difficulties, but are generally more expensive.

To avoid the difficulties of representing such small numbers in a sixteen bit, fixed point processor, this invention may be implemented with two cascaded first order low pass filters with continuous time forms of:

$$Q_1(s)=(K_q)^{1/2}/(s+a_1), \text{ and}$$

$$Q_2(s)=(K_q)^{1/2}/(s+a_2),$$

which are discretized as:

$$Q_1(z)=a/(1+b_1z^{-1}), \text{ and}$$

$$Q_2(z)=a/(1+b_2z^{-1}).$$

Example parameters following a bi-linear discretization and a1ms sampling period for the above filters are:

| MODE | $a_1$ | $b_1$ | $b_2$ |
|---|---|---|---|
| HEAVE | 1.1156e-2 | -0.99878 | -0.99268 |
| ROLL | 2.1160e-2 | -0.99501 | -0.99501 |
| PITCH | 1.1152e-2 | -0.99800 | -0.99203 |

According to this implementation, the smallest value in the numerator has its least significant bit in the 0.01 region, which is much bigger than $2^{-15}$ and lends to a more precise approach for fixed point processor implementations.

Figure 6:
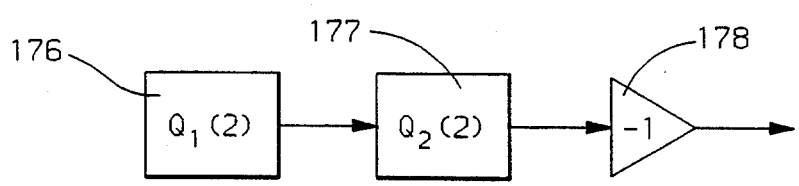
FIG. 6 is a block diagram of an alternate embodiment of a low pass filter for use in the control of FIG. 2.

FIG. 6 illustrates the filter flow for the cascaded first order low pass filter implementation. The two filters 176 and 177 are cascaded as shown to produce two pole filter processing. In this implementation the phase inversion is obtained, not by inverting the signs of filter constants, but by inverting the signs of the calculated values in a separate inversion step 178. In form useful for a programmed digital microcomputer, the embodiment of FIG. 6 comprises two single pole, low pass filter equations followed by a sign inversion. An example for estimated absolute body heave velocity H'(n) follows:

$$H_1'(n)=H_aRV_H(n)-H_{b1}H_1'(n-1)$$

$$H_2'(n)=H_aH_1'(n)-H_{b2}H_2'(n-1)$$

$$H'(n)=-H_2'(n),$$

wherein $H_1'(n)$ and $H_2'(n)$ are the intermediate calculated values of the first and second single pole, low pass filters, Ha is the forward gain constant for each of the filter equations and $H_{b1}$ and $H_{b2}$ are the filter pole calibration constants for the first and second filter equations, respectively. Similar equations are used for estimated absolute body pitch and roll velocities P'(n) and R'(n). The cascaded single pole low pass filters 176, 177 and inverter 178 are considered the equivalent of the previously described two pole, low pass filter with additional phase inversion for purposes of the claims of this patent and are preferred if microcomputer 22 is based on a sixteen bit, fixed point processor. In performing the programmed low pass filtering and phase inversion of the relative body modal velocities as described above, either with the two pole filter algorithm or the cascaded one pole equivalent, microcomputer 22 comprises low pass filters 67-69.

Referring again to FIG. 4, once the state variables are computed at block 171, the routine moves through blocks 172, 173 and 174 wherein it selects gains for desired system performance, determines desired suspension actuator force and generates the output actuator control signals in a manner such as described in U.S. Pat. No. 5,071,157. At block 175, the output actuator control signals are delivered to actuators 12 for control of the vehicle suspension system. It will be recognized that blocks 172, 173 and 174 can be replaced by any suspension or chassis control algorithm that requires absolute body modal velocity signals such as absolute heave, roll and pitch velocity signals or their equivalents to control vehicle suspension or other chassis systems. Since the details of the functions of blocks 172, 173 and 174 are not central to this invention, they are not reproduced in detail herein. Reference may be made to U.S. Pat. No. 5,071,157, the description of which is incorporated herein by reference.

Figure 7:
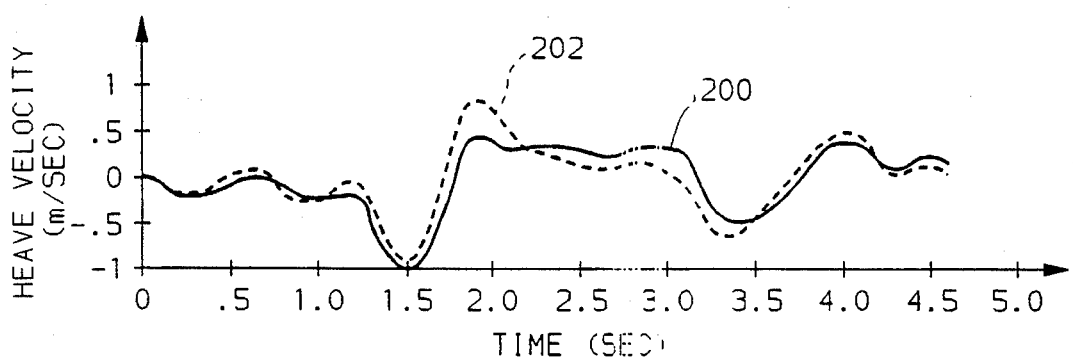
FIGS. 7, 8 and 9 illustrate test results comparing estimated absolute body heave, pitch and roll velocities determined according to this invention to absolute body heave, roll and pitch velocities derived from accelerometers as in the prior art.
Figure 8:
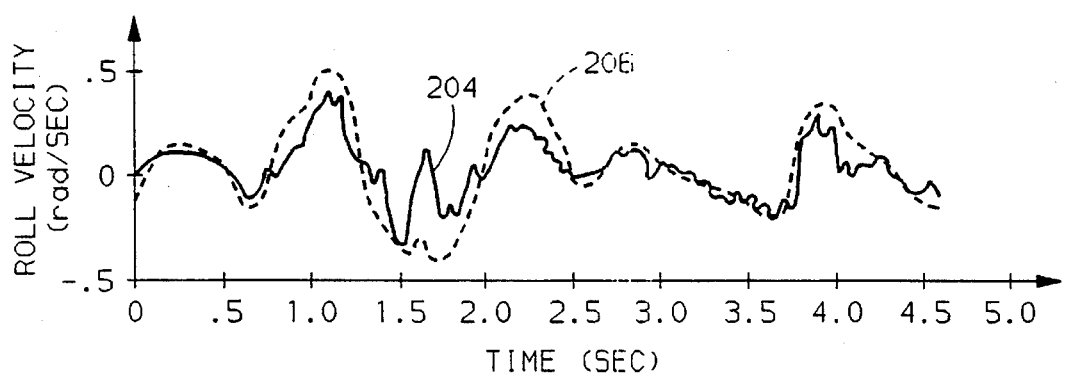
Figure 9:
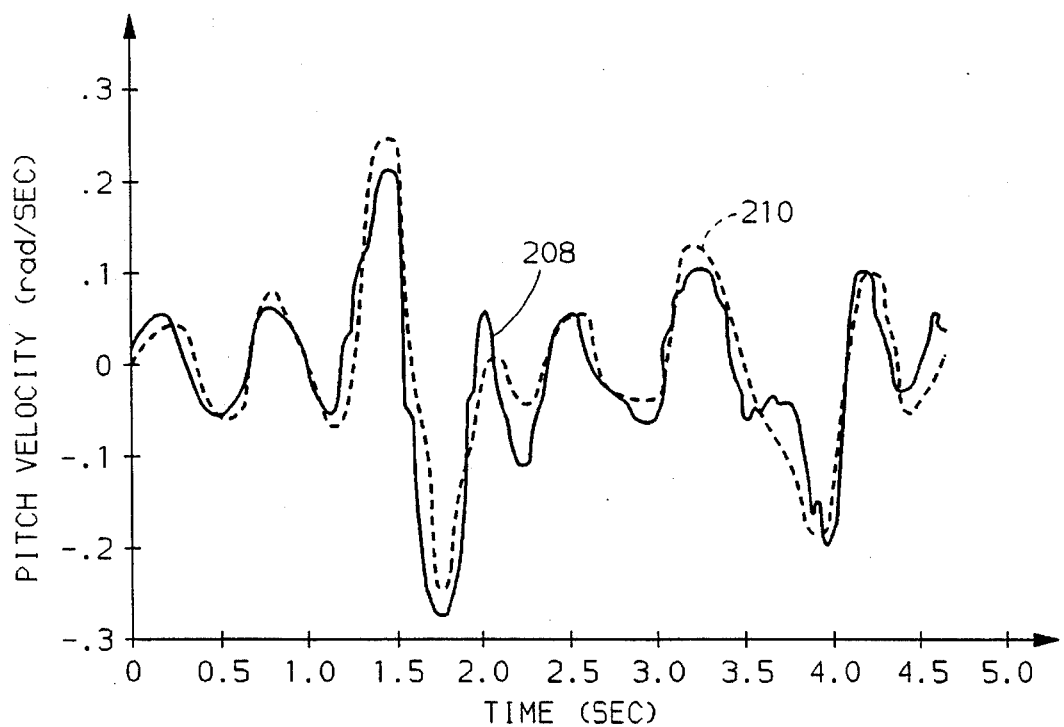

FIGS. 7, 8 and 9 show vehicle heave, roll and pitch velocity signals plotted against time for the embodiment of FIGS. 1–6. Traces 200, 204 and 208 represent the absolute body heave, roll and pitch velocity signals derived from body accelerometers as described in the Background of the Invention. Traces 202, 206 and 210 show the estimated absolute body heave, roll and pitch velocity signals determined from the relative position sensors according to this invention. As shown, the estimated absolute body heave, roll and pitch velocity signals shown in traces 202, 206 and 210, derived according to this invention using only the signals of the relative body/wheel position, track the absolute body heave, roll and pitch velocity signals shown in traces 200, 204 and 208, derived from the absolute inputs provided by accelerometers 16. Thus, it is shown that accurate estimates of absolute body heave, roll and pitch velocity of a motor vehicle can be achieved according to this invention without the need of any sort of body accelerometer, either point accelerometers as previously described or body axial accelerometers, also known to those skilled in the art.

However, FIGS. 7–9 show an additional advantage over the prior art. A comparison of estimated absolute body modal velocity traces 202, 206 and 210 with the corresponding accelerometer derived absolute body modal velocity traces 200, 204 and 208, respectively, shows that the signals derived according to this invention are smoother, with less high frequency noise, and yet are fully responsive to the low frequency amplitude variations with no time delays. A smoother input signal to the control algorithm leads to more stable suspension control; and the difference can be felt in the vehicle ride.

Figures 11, 12:
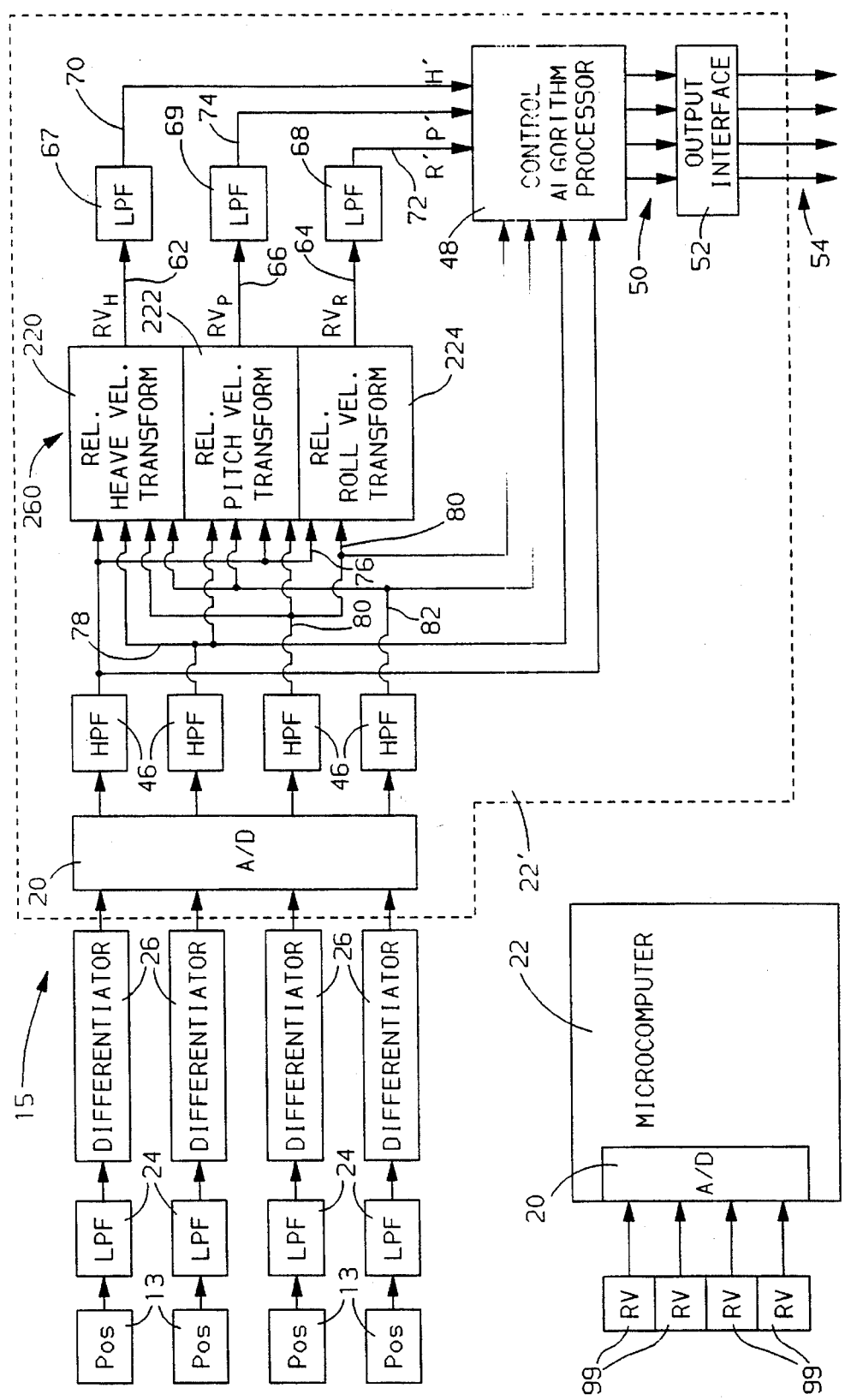
FIG. 11 illustrates schematically an alternative embodiment of a suspension control according to this invention using a modified roll velocity transform.
FIG. 12 illustrates an example implementation of this invention for the vehicle of FIG. 10.

Some vehicle bodies may have front to rear flexing or flexing within the front or rear suspension that can affect the accuracy of the relative and estimated absolute body roll velocity determined according to this invention. Referring to FIG. 11, the apparatus shown implements this invention to prevent body or suspension flexing from affecting body roll velocity determinations. The apparatus shown is identical to that described above with reference to FIG. 2, except as follows.

In microcomputer 22' of FIG. 11, geometric transform processor 260 is illustrated as three separate geometric transform processors 220, 222 and 224 for achieving the relative body heave, pitch and roll velocity signal transforms, respectively. Processors 220 and 222 achieve the relative body heave and pitch velocity signal transforms as described above with reference to FIG. 2. Processor 224, however, implements the relative roll velocity transform taking into account only the relative velocity sensors at the front or the rear of the vehicle. For example, if a vehicle is found to have rear suspension flexing, the relative body roll velocity is calculated from only the front relative velocity signals $rv_1$ and $rv_3$ on lines 76 and 80 according to the following modified relative roll velocity transform:

$$RV_R = (-rv_1 + rv_3)/tw.$$

Block 180 of the control routine shown in FIG. 7 is thus modified as follows:

ti $RV_R(n) = [-rv_1(n) + rv_3(n)]/tw.$

By using only $rv_1$ and $rv_3$ as described above, the relative body roll velocity signal is determined in a manner eliminating, or substantially reducing, the effect of body flexing or rear suspension flexing. If a vehicle is found not to have rear suspension flexing but to have front suspension flexing, the rear relative position sensors may be used to determine the relative body roll velocity signal, in which case the signals $rv_2$ and $rv_4$ are used in place of $rv_1$ and $rv_3$ above.

When the relative roll velocity $RV_R$ is low pass filtered at block 68 as described above with reference to FIG. 11, the resultant estimated absolute body roll velocity closely tracks the values obtained according to the prior an apparatus shown in FIG. 1.

Figure 10:
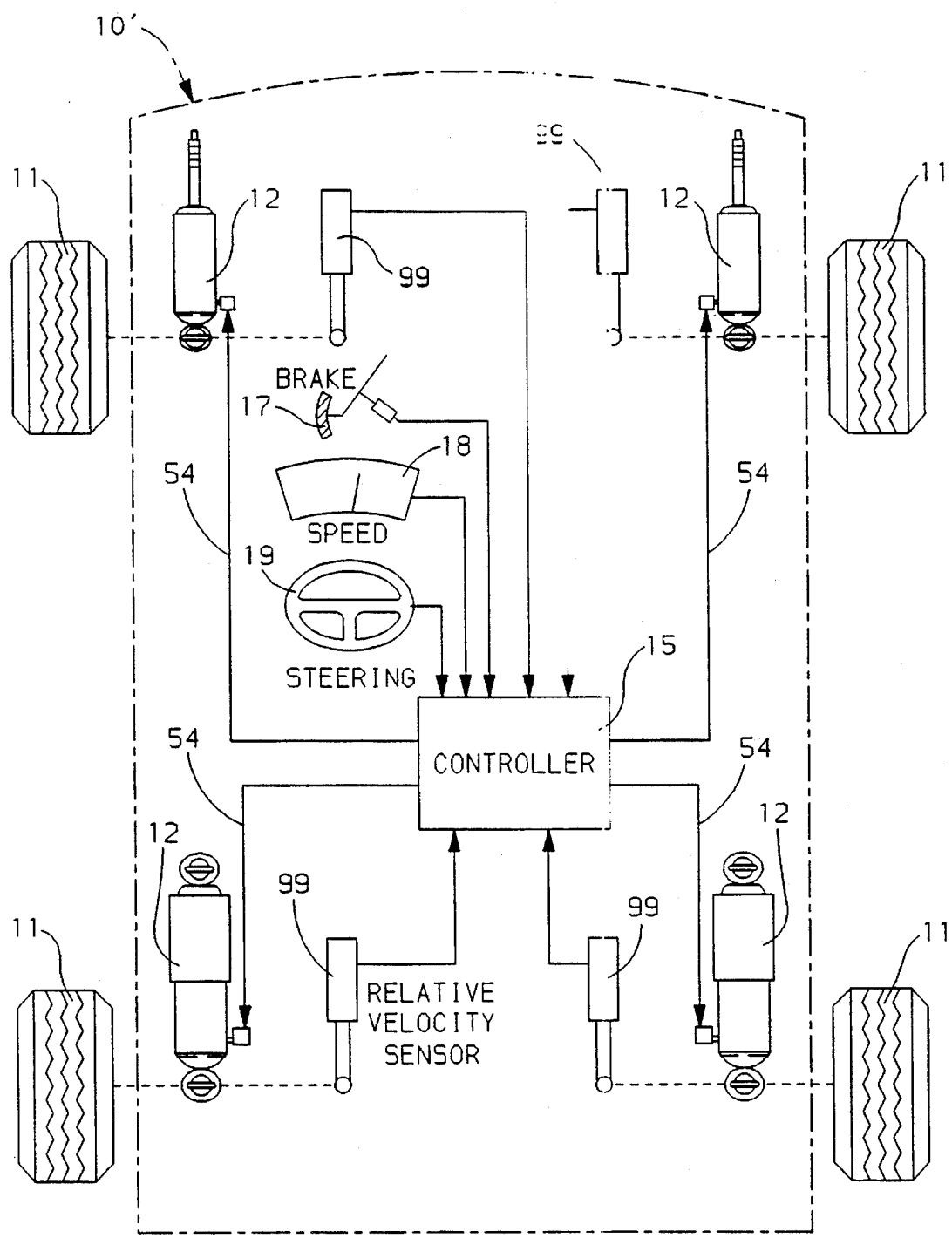
FIG. 10 illustrates an alternative embodiment of a vehicle and suspension system according to this invention using relative velocity sensors.

Referring to FIG. 10, another exemplary implementation of the apparatus of this invention is shown. The vehicle of FIG. 10 is similar to the vehicle shown in FIG. 3 with the modification that relative position sensors 13 have been replaced with relative velocity sensors 99. Each relative velocity sensor has a first part affixed to vehicle wheel assembly 11 and a second part affixed to vehicle body 10' in a manner similar to the mounting of position sensors 13. With the occurrence of relative movement between a wheel assembly 11 and vehicle body 10', each relative velocity sensor 99 outputs a signal indicating the relative velocity of the respective wheel 11 relative to the adjacent corner of body 10'. Use of relative velocity sensors eliminates the need of the differentiation circuitry required to obtain relative velocity signals from the relative position sensors. However, if a vehicle load leveling system is also implemented, another vehicle height sensor may be required. Sensors suitable for use as relative velocity sensors are known to and readily available to those skilled in the art, and the details of particular sensors need not be set forth herein.

Referring now to FIG. 12, with the vehicle as shown in FIG. 10 utilizing relative velocity sensors 99, the implementation of the sensors and circuitry is simplified as shown. In place of position sensors 13, low pass filters 24 and differentiators 26 (FIGS. 4 and 12), relative velocity sensors 99 are implemented and provide their signals directly to A/D converter 20 of microcomputer 22. If desired, external low pass filters may be implemented. Internally, microcomputer 22 may function either as shown in FIG. 2 or as in FIG. 11.

The above-described implementations of this invention are example implementations. Moreover, various other improvements and modifications to this invention may occur to those skilled in the art; and such improvements and modifications will fall within the scope of this invention as set forth below.

The embodiments in which an exclusive property or privilege is claimed are defined as follows:

1. A method for controlling an actuator in a chassis system on a vehicle, comprising the steps of:
   (a) obtaining from a set of sensors, mounted on the vehicle to sense vertical motion between a set of vehicle wheels and a vehicle body suspended therefrom, a set of relative velocity signals between the set of vehicle wheels and a set of points on the suspended vehicle body;
   (b) determining from the set of relative velocity signals a set of estimated absolute body modal velocity signals for the suspended vehicle body;
   (c) deriving an actuator control signal from the set of estimated absolute body modal velocity signals; and
   (d) applying the actuator control signal to the actuator.

2. The method of claim 1 wherein the set of estimated absolute body modal velocity signals comprises estimated absolute body heave, roll and pitch velocity signals.

3. The method of claim 2 wherein:
   (a) the estimated absolute body heave velocity signal is determined by geometrically transforming the set of relative velocity signals into a relative heave velocity signal, filtering the relative heave velocity signal through a first two pole, low pass filter and providing a signal inversion for the filtered relative heave velocity signal;
   (b) the estimated absolute body roll velocity signal is determined by geometrically transforming the set of relative velocity signals into a relative roll velocity signal, filtering the relative roll velocity signal through a second two pole, low pass filter and providing a signal inversion for the filtered relative roll velocity signal; and (c) the estimated absolute body pitch velocity signal is determined by geometrically transforming the set of relative velocity signals into a relative pitch velocity signal, filtering the relative pitch velocity signal through a third two pole, low pass filter and providing a signal inversion for the filtered relative pitch velocity signal.

4. The method of claim 3 wherein each of the filtering steps is accomplished by calculation in a digital computer using a discrete two pole, low pass filter equation comprising a linear sum of numerator terms including the present and previous two values of one of the relative heave, roll and pitch velocity signals and denominator terms including the previous two values of a corresponding one of the estimated absolute heave, roll and pitch velocity signals, and the signal inversion is incorporated into gain constants for the numerator terms.

5. The method of claim 3 wherein each of the filtering steps is accomplished by calculation in a digital computer using a pair of cascaded discrete single pole, low pass filter equations and the signal inversion is accomplished by inverting the sign of the output value.

6. The method of claim 3 wherein each of the first, second and third two pole, low pass filters is effective to pass signals having frequency characteristics of resonant motion of the vehicle body in the heave, roll and pitch modes, respectively, but to significantly reduce signals having higher frequency characteristics of one of the vehicle wheels in vertical motion.

7. A method for controlling a motor vehicle suspension system, comprising the steps of:

(a) obtaining from a set of sensors, mounted on the vehicle to sense vertical motion between a set of vehicle wheels and a vehicle body suspended therefrom, a set of relative velocity signals between the set of vehicle wheels and a set of points on the suspended vehicle body;

(b) determining from the set of relative velocity signals a set of estimated absolute body modal velocity signals for the suspended vehicle body;

(c) deriving all actuator control signal from the set of estimated absolute body modal velocity signals; and (d) applying the actuator control signal to a variable force actuator coupled between one of the set of vehicle wheels and a corresponding one of the set of points on the vehicle body.

8. The method of claim 7 wherein the set of estimated absolute body modal velocity signals comprises estimated absolute body heave, roll and pitch velocity signals.

9. The method of claim 8 wherein:

(a) the estimated absolute body heave velocity signal is determined by geometrically transforming the set of relative velocity signals into a relative heave velocity signal, filtering the relative heave velocity signal through a first two pole, low pass filter and providing a signal inversion for the filtered relative heave velocity signal;

(b) the estimated absolute body roll velocity signal is determined by geometrically transforming the set of relative velocity signals into a relative roll velocity signal, filtering the relative roll velocity signal through a second two pole, low pass filter and providing a signal inversion for the filtered relative roll velocity signal; and (c) the estimated absolute body pitch velocity signal is determined by geometrically transforming the set of relative velocity signals into a relative pitch velocity signal, filtering the relative pitch velocity signal through a third two pole, low pass filter and providing a signal inversion for the filtered relative pitch velocity, signal.

10. The method of claim 9 wherein each of the first, second and third low pass filters is effective to pass signals having frequency characteristics of resonant motion of the vehicle body in the heave, roll and pitch modes, respectively, but to significantly reduce signals having higher frequency characteristics of one of the vehicle wheels in vertical motion.

11. A vehicle comprising, in combination:

a vehicle body suspended independently by suspension apparatus from each of four vehicle wheels;

a set of sensors on the vehicle responsive to vertical movement between each of the vehicle wheels and an adjacent point on the vehicle body to generate output signals;

electrical signal processing apparatus responsive to the signal outputs of the set of sensors to generate a set of relative velocity signals between selected ones of the wheels and the adjacent points on the vehicle body;

a microcomputer controller coupled to the relative position sensors, the microcomputer controller comprising means responsive to the set of relative velocity signals to determine a set of estimated absolute body modal velocity signals and for determining therefrom an output actuator control signal; and an actuator responsive to the output actuator control signal to control a chassis system of the vehicle.

12. The vehicle of claim 11 in which the actuator couples one of the vehicle wheels and the vehicle body and is responsive to the output actuator control signal to control relative motion between the one of the vehicle wheels and the vehicle body.

13. The vehicle of claim 12 in which the set of sensors comprises relative position sensors and the electrical signal processing apparatus comprises electrical differentiating apparatus.

14. The vehicle of claim 12 in which the set of sensors comprises relative velocity sensors.

15. The vehicle of claim 12 in which the actuator comprises a controllable, variable force damper.

16. The vehicle of claim 12 wherein the means responsive to the set of relative velocity signals further comprises:

(a) means for geometrically transforming the set of relative velocity signals into a set of relative body modal velocity signals;

(b) two pole, low pass filter apparatus effective to filter the relative body modal velocity signals; and (c) means for producing a signal inversion in the filtered relative body modal velocity signals to generate the estimated absolute body modal velocity signals.

17. The method of claim 16 wherein the filter apparatus comprises the microcomputer programmed with a discrete two pole, low pass filter equation comprising a linear sum of numerator terms including the present and previous two values of one of the relative body modal velocity signals and denominator terms including the previous two values of a corresponding one of the estimated absolute body modal velocity signals, and the signal inversion is incorporated into gain constants for the numerator terms.

18. The method of claim 16 wherein the filter apparatus the filters comprises the microcomputer programmed with a pair of cascaded discrete single pole, low pass filter equations and the signal inversion is accomplished by inverting the sign of the output value.

19. The vehicle of claim 16 wherein the filter apparatus is effective to pass signals having frequency characteristics of a resonant body modal vibration but significantly reduce signals having frequency characteristics of resonant vertical motion of the one of the vehicle wheels.

20. The vehicle of claim 19 in which the set of estimated absolute body modal velocity signals comprises an absolute heave velocity signal, an estimated absolute roll velocity signal and an estimated absolute pitch velocity signal, and the resonant body modal vibrations are resonant motions of the vehicle body in the heave, roll and pitch modes.

21. In a vehicle having a body suspended independently from a plurality of wheels by suspension apparatus, the vehicle comprising vertical motion sensing apparatus effective to generate a set of relative velocity signals between selected ones of the wheels and adjacent points on the body and a suspension actuator coupling one of the wheels and the vehicle body, the vehicle further comprising a suspension control effective to derive from the set of relative velocity signals a set of relative body modal velocity signals and to derive from the set of relative body modal velocity signals an actuator control signal, the vehicle further comprising means for applying the actuator control signal to the actuator to control body vertical motion in real time, the improvement comprising:

a two pole, low pass filter apparatus and means for providing a signal inversion, the filter apparatus and means for providing a signal inversion acting on the set of relative body modal velocity signals to estimate therefrom a set of absolute body modal velocity signals from which the actuator control signal is derived.

22. A vehicle comprising, in combination:

a vehicle body suspended independently by suspension apparatus from right front, left front, right rear and left rear vehicle wheels;

a set of sensors responsive to vertical movement between each of the vehicle wheels and an adjacent point on the vehicle body to generate output signals;

electrical signal processing apparatus responsive to the signal outputs of the set of sensors to generate a set of right front, left front, right rear and left rear relative velocity signals between selected ones of the wheels and the adjacent points on the vehicle body;

a microcomputer controller coupled to the relative position sensors, the microcomputer controller comprising (a) means for deriving from the set of relative velocity signals a set of relative body heave, roll and pitch velocity signals, the relative body roll velocity signal being derived from only one of (1) the difference between the right front and left front relative velocity signals and (2) the difference between the right rear and left rear relative velocity signals, (b) means for deriving from the relative body heave, roll and pitch velocity signals a set of estimated absolute body heave, roll and pitch velocity signals, and (c) means for deriving from the estimated absolute body heave, roll and pitch velocity signals an output actuator control signal; and an actuator coupling one of the vehicle wheels and the vehicle body, the actuator being responsive to the output actuator control signal to control relative motion between the one of the vehicle wheels and the vehicle body.

23. The vehicle of claim 22 in which the means for deriving from the relative body heave, roll and pitch velocity signals a set of estimated absolute body heave, roll and pitch velocity signals comprises two pole low pass filter apparatus and means for providing a signal inversion.

* * * * *